United States Patent [19]

Richart et al.

[11] Patent Number: 5,187,220
[45] Date of Patent: Feb. 16, 1993

[54] THERMOSETTING RESIN-BASED COATING POWDERS CONTAINING METAL FLAKES

[75] Inventors: Douglas S. Richart, Reading; Andrew T. Daly, Sinking Spring, both of Pa.

[73] Assignee: Morton International, Inc., Chicago, Ill.

[21] Appl. No.: 632,376

[22] Filed: Dec. 21, 1990

[51] Int. Cl.$^5$ .............................. C08K 3/08; B32B 5/16
[52] U.S. Cl. ..................................... 524/441; 524/449; 523/204; 523/205; 428/407
[58] Field of Search ................. 523/204, 205; 524/441, 524/449; 428/407

[56] References Cited

U.S. PATENT DOCUMENTS 3,632,369 12/1969 Hahn ................................... 428/407
4,197,351 4/1980 Rolles .................................. 428/407

Primary Examiner—Paul R. Michl
Assistant Examiner—Tae H. Yoon
Attorney, Agent, or Firm—Wayne E. Nacker; Gerald K. White

[57] ABSTRACT

A flake-containing coating powder is obtained by admixing a coating powder that based upon a thermosetting resin and metallic or non-metalic flake. The powder and flake are mixed at a temperature in the range of above the softening temperature of the thermosetting resin of the coating powder but below the melting temperature of the thermosetting resin and with sufficient mechanical shear to prevent agglomeration of the coating powder particulates. Mixing is for a time sufficient to embed at least about 75% by weight of the flake into the coating powder.

4 Claims, No Drawings

THERMOSETTING RESIN-BASED COATING POWDERS CONTAINING METAL FLAKES

The present invention is directed to coating powders and more particularly to coating powders containing flakes, particularly metallic or mica flakes.

BACKGROUND OF THE INVENTION

The use of powder coating methods to provide tough, abrasion-resistant finishes is well known, as described, for example in *Kirk-Othmar, Encyclopedia of Chemical Technology*, third Edition Vol. 19, pp. 1-27, (1982). Coating powders are characterized by very low organic emissions during powder coating processes and therefor have important environmental, health and safety advantages relative to other types of coatings.

There are circumstances where it would be highly desirable to powder coat a substrate with a metal-containing coating powder so as to provide a coating with a highly reflective, metallic appearance or to provide a sparkle finish. In the area of decorative coatings, striking effects can be achieved through metal-containing coatings. Highly reflective coatings are useful in providing identification and easy recognition of objects. Metal-containing coatings may be used to lower the temperature of vessels, provide solar reflectivity, etc. The widespread utility of conventional solvent-based paints using leafing aluminum pigments clearly illustrates the utility and desirability of metallic coatings. To date, metal-containing coatings applied by powder coating processes have not achieved the luster provided by solvent-based paints, and/or, it has proven difficult to maintain uniformity of coating.

When flat, pancake-like metal flakes, such as "leafing aluminum" are used in a solvent-based paint, the metal flakes tend to align parallel to the surface of the coating, thereby presenting flat, reflective surfaces which give a metallic appearance to the coating when the paint dries or is baked. Similar results have been difficult to achieve in powder coatings. It is known to integrally incorporate metal flakes into the coating powder by admixing the metal flakes with the resin, flow-control agents, curing agents, pigments, fillers, etc., prior to melt-compounding of the ingredients. However, during grinding of the melt-compounded composition to produce a coating powder, the flakes are very significantly fragmented, and the finish that results from such a coating powder has a dull, grey appearance.

U.K. Patent Specification 1,404,556 published Sep. 3, 1975 describes coating powders in which aluminum flakes are imbedded into the powder by milling, e.g, in a ball-mill. Again, the flakes are very significantly fragmented. Coating powders produced by this method do not achieve the luster of comparable solvent-based metallic paints.

U.S. Pat. No. 4,197,351 to Rolles et al. describes brush polishing a dry mixture of metal flakes and plastic powder so as to embed the flakes into the powder. Although the coating powder obtained may have a high luster, the brush polishing method described in this patent is impractical for industrial scale production of coating powders.

The most straight-forward method of obtaining a metallic finish from a powder coating process is to simply admix metal flakes with the polymeric coating powder particulates. However, in the powder coating process, as is actually performed in industrial settings, such an admixture results in inconsistent coatings. In electrostatic coating, coating powder is sprayed through a gun where a high voltage corona discharge is used to establish an ionized field. As the powder particles pass through the ionized field, they become charged and are attracted to the substrate, which is usually a metallic article to be coated. The powder is subsequently fused to form a continuous film. In the spraying process, any powder which is not deposited on the substrate is collected in a reclaim system and returned for admixture with the virgin material for reapplication. When metal flakes are merely admixed with the polymeric coating particulates, the flakes are not charged to the same extent or deposited at the same rate as the polymeric coating powder particulates. Over a period of time during which overspray is continuously reclaimed and admixed with virgin material, the metallic flake pigment becomes more concentrated in the powder being sprayed, changing the appearance of the resulting finish from the finish which resulted from spray at the start of the run. Eventually, the higher concentration of metal flakes may interfere with the charging mechanism. If the powder in the ionized field becomes too conductive, the electrostatic gun may "short out".

There remains a need for a practical method to produce coating powders which result in a lustrous metallic finish that is consistent over time in a process in which overspray particles are reclaimed and returned. There also exists a need for more uniform coating (over time) from coating powders containing non-metallic flakes, such as mica flakes.

SUMMARY OF THE INVENTION

In accordance with the invention, there is provided a method for adhering metallic and non-metallic flakes to polymeric coating powder particulates, which particulates comprise a thermosetting resin. In accordance with the process, thermosetting resin coating powder particulates and flakes are admixed in a high-speed blender under fluidizing conditions at temperatures above the softening point of the resin but well below the melting temperature of the resin and for a time sufficient to adhere at least about 75% of the flakes and preferably at least about 95% of the flakes to the thermosetting resin coating powder particulates. Because the flakes are adhered to the thermoplastic resin particulates, the composition does not change significantly over time in a process in which overspray coating powder is reclaimed and reintroduced. Accordingly, the fused finishes which are eventually produced are uniform over time.

DETAILED DESCRIPTION OF CERTAIN PREFERRED EMBODIMENTS

It is known that pigments, such as metal particles, might be adhered to plastic particles through high-shear mixing. For example, U.S. Pat. No. 3,632,369 to Hahn describes adhering various pigments to various thermoplastic resins in high-speed mixers. However, flakes, such as metal flakes, are subject to very substantial fragmentation, and it had heretofore been thought that under high-shear mixing, flakes would fragment very substantially, much in the manner of the fragmentation of metal flakes which occurs during the ball-milling described in above-mentioned U.K. Patent Specification 1,404,556 and likewise produce poor quality finishes. Early attempts to adhere metal flakes to thermosetting resin coating powder particulates were therefore conducted for very short times, during which there was no significant elevation of temperature. Some adhesion between metal flakes and the coating powder particulates was achieved, but the adhesion proved to be incomplete and inadequate. Consequently, problems of increased metal flake concentration over time, similar to those incurred with a simple admixture of metal flake and coating powder, occurred.

Some of the same considerations apply to non-metallic flakes which are desirably incorporated into powder coatings to achieve a particular effect in the finish. For example, transparent or translucent flakes, particularly mica, may be used to produce a pearlescent finish. Inconsistencies in coating composition over time result in varying finishes throughout the duration of a coating run.

Flake sizes are described in terms of thickness, breadth and length. Breadth is the minimum dimension in the flat surface; length is the dimension in the direction perpendicular to the breadth, regardless of whether or not it is the longest dimension. The "ratio" of a flake is the ratio of its breadth to thickness. Herein, flakes having thicknesses from about 0.05 to about 2 microns and breadths from about 1 to about 100 microns may be used. Flake ratios range from about 10 to about 2000.

One method by which applicants initially attempted to adhere metal flakes to thermosetting resin coating powder particulates was to add a small amount of solvent in an attempt to make the coating powder particulates tacky. Unfortunately, this resulted in an agglomerated mass of the coating powder particulates.

Surprisingly and unexpectedly, it was discovered that thermosetting resin coating particles and metallic or non-metallic flakes, when admixed and subjected to intermediate-to-high shear in a high speed mixer at a temperature range above the softening temperature of the thermosetting resin, but well below the melting point of the thermosetting resin, and for a period of time in this temperature range as required to adhere over about 75% by weight of the flakes, and preferably for such additional time as required to adhere over about 95% by weight of the flakes, to the thermosetting resin coating powder particulates, produce a coating powder which is not agglomerated, but in which the flakes are firmly adhered to the particulates. Although the flakes embed into and adhere to the particulates, the shear produces sufficient relative motion to the heat-softened particulates to prevent their agglomeration. Finishes which result when the flakes are metallic have a luster comparable to that of solvent-based, metal flake-containing paints.

The present invention is directed to those coating powders in which the resin is a thermosetting polymer. Coating powders based upon thermosetting resins comprise the major volume of coating powders used industrially. The composition of such coating powders comprise the thermosetting resin, a cross-linking agent and/or or cure catalyst (or the resin is self cross-linking), (optionally, but almost always) a flow control agent, and such optional components as fillers, additional pigments, and colorants. (Herein, unless stated otherwise, all percentages are by weight and, unless stated otherwise, all weight percentages are expressed relative to the weight of the thermosetting resin of the coating powder composition.) Classes of resins suitable for use in the present invention include but are not limited to epoxy resins, polyester resins, polyurethane resins, epoxy/polyester hybrid resins and acrylic resins. More detailed descriptions of particular thermosetting resins useful in coating powders are described, for example, in U.S. Pat. Nos. 3,177,090; 3,438,849; 3,211,695; 3,028,251; 3,214,403; 3,803,111; 3,759,854 and 3,822,240, the teachings of which are incorporated herein by reference.

The particular resins are selected with softening temperatures sufficiently high to prevent the individual coating powder particulates from sintering or fusing during transportation and storage. The softening temperatures are generally in the range of 30°-70° C., most typically in the 35° C.-60° C. range. Furthermore, the resin should have a melting temperature sufficiently low that it can be melt-compounded at a temperature well below a temperature where reaction between the resin and the cross-linking agent and/or cure catalyst results in substantial curing of the resin. For any particular resin type, the softening temperature and the melting point is generally a function of the monomers present and molecular weight.

The cross-linking agent and/or cure catalyst is selected appropriate to the resin type used and is further selected to provide substantial curing only at a temperature well above the melting point of the resin. Epoxy resins may be cured, for example, by modified and substituted dicyandiamides and by anhydrides. Hydroxyl functional polyester resins may be cured, for example, with a blocked multifunctional isocyanate (e.g., a caprolactam-blocked multifunctional isocyanate) to form a urethane polyester. Acid functional polyester resins are typically cured with triglycidyl isocyanurate (TGIC). Epoxy-polyester hybrids cure, by reaction with each other. Hydroxyl functional acrylic resins may be cured, for example, with a blocked multifunctional isocyanate. The amount of cross-linking agent and/or curative is that sufficient to effect curing, typically between about 5 and about 20 wt. percent of the resin, depending upon the particular chemistry and stoichiometry involved.

Many compositions for coating powders contain flow-control additives which modify surface tension and thereby eliminate crater formation. Flow-control additives known in the art include, but are not limited to, low molecular weight polyacrylates, and silicones. Flow-control additives are typically used at between about 0.8 and about 1.5 wt. percent relative to the resin.

Fillers, additional pigments, and other colorants, if used, may comprise up to about 50 wt. percent relative to the resin.

The thermosetting resin coating particulates are produced in the usual manner. The components are blended, and then are melt-compounded with heating above the melting point of the resin for a short time, e.g., 30-90 sec., so that no significant curing occurs. The molten compound is extruded, and after extrusion, the composition is rapidly cooled. The composition is then ground and the particulates sorted according to size. For electrostatic coating applications, the particulates are generally in the 20-100 micron size range, more preferably, in the 20-40 micron size range. Larger particulates are useful for fluidized bed coating operations.

The flakes are flat, pancake-like structures. Aluminum flakes (the metal flake most commonly used) may either be of the very thin "leafing" variety or thicker non-leafing variety. Other metals that may also be used include nickel, bronze, zinc and stainless steel.

The flakes may fragment somewhat during their fusion to the coating powder particulates, but this amount of fragmentation is substantially less than seen in other processes of adhering flakes to coating powder particulates. Accordingly, the effects on the final finish are relatively minor. The luster of a finish with non-leafing aluminum (used primarily for a sparkle effect) is only slightly diminished due to fragmentation of the aluminum flakes. The luster of a finish with leafing aluminum (useful for forming a mirror-like finish) is actually enhanced in some cases by some fragmentation of the flakes during the process in which the flakes are adhered to the particulates.

The amount by weight of flakes relative to the amount by weight of coating powder particulates may vary over a wide range, depending upon a variety of factors, such as the relative densities of the flakes and coating particle particulates, the finish desired, e.g., whether the flakes should provide a uniform appearing surface, such as a mirror-like surface, or whether the flakes are provided for accent, such as sparkle, and the thickness of the flakes. Flakes are typically used at between about 0.5 and about 20 wt. percent relative to the weight of the powder coating particulates, most typically between about 1 and about 5 wt. percent.

The process in accordance with the invention may be performed in any mixing apparatus which is capable of providing the shear necessary to fuse the flakes to the softened powder coating particulates and at the same time maintain the particulates in sufficient relative motion so as to prevent agglomeration of the coating powder particulates. Suitable apparatus includes high-intensity and medium-intensity mixers having rotating blades, such as those available from Henschel and Littleford. In a rotating blade mixer, blade tip speed of at least about 3 meters per second generally provide the requisite shear force to fuse the flakes to the coating powder particulates while maintaining sufficient relative motion of the particulates so as to prevent agglomeration of the coating powder particulates. The practical upper limit of tip speed has not been determined; however, with increasing shear force, increased amounts of heat must be dissipated. Also, too high shear may unduely fragment the flakes. With present day equipment, the upper limit of tip speed appears to be in the range of about 50 to about 100 meters per second. The necessary thermal energy for effecting fusion between the coating powder particulates and the metal flakes may be provided entirely by the mechanical shear of mixing; however, it is preferred that the mixing apparatus be jacketed to provide for external heating and/or cooling. The mixing shear will provide thermal energy which may range from too little to too much to maintain a suitable fusion temperature; accordingly, external heating and/or cooling is preferably provided. Specific temperatures, mixing times, shear forces, etc. will depend upon a number of factors, such as the composition of the particular thermosetting resin coating powder, particulate and flake size, and specifications, e.g., blade speed, of the mixing apparatus.

The process in accordance with the present invention, particularly when metal flakes are used, should be performed under an inert atmosphere, e.g., under nitrogen, to minimize risk of explosion.

The invention will now be described in greater detail with respect to specific examples.

EXAMPLES 1-4

The process in accordance with the present invention was performed in a Littleford blender, a medium intensity mixer having a tip speed of 4.02 meters/second (158 inches per second) and has a power ratio of 1 HP/2-4 lbs of product mixed. The mixer is jacketed to provide heating and cooling water and is connected to a source of nitrogen to maintain an inert atmosphere within the mixer.

The thermosetting resin coating powder in each example is 23-9030, a polyester-based coating powder sold by Morton International, Inc., having particulates in the range of 30 microns. The aluminum flake is leafing aluminum with flakes having a largest dimension of 3 microns.

The coating powder was charged into the mixer and nitrogen caused to flow therethrough. In each case, the jacket temperature was brought up to 60° C. and the material brought up to 41° C. At this time the blades were activated until the temperature reached 50° C. The blades were stopped and the aluminum flake was added. Mixing continued for the number of minutes set forth in the Table below with the material reaching a final temperature also set forth in the Table. At this time, mixing was stopped and cooling water was introduced into the jacket to bring the material down to ambient temperature. The resulting powders were then used to coat a metallic substrate.

Brightness is a subjective determination. Gloss is measured on a meter at incident angles of 20° and 60°. HPGT @400 means hot plate gel time at 400° F. (204° C.). HPMF @375 means hot plate melt flow at 375° F. (191° C.). Aluminum is expressed at a weight percent relative to total coating powder composition.

TABLE

| | Run 1 | Run 2 | Run 3 | Run 4 |
|---|---|---|---|---|
| Process Conditions | | | | |
| % Aluminum | 3 | 3 | 3 | 2 |
| Mixing time (min.) | 30 | 12 | 12 | 12 |
| Temp. Max. °C. | 60 | 60 | 65 | 65 |
| Powder Properties | | | | |
| HPGT @ 400 | 88 | 83 | 88 | 87 |
| HPMF @ 375 | 90 | 95 | 105 | 95 |
| Coating Properties | | | | |
| Gloss 20°/60° | 62/160 | 87/160 | 73/160 | 100/160 |
| Brightness | very good | good | very good | good |

It should be noted that in other experiments when temperatures reached 70° C. for this particular resin, some aggolmeration begin on surfaces of the mixing apparatus, although usable metal-containing coating powder was obtained.

EXAMPLE 5

The process was performed in a Henschel mixer at a speed of 1500 RPM and tip speed of 72 meters/sec. The Henschel is a high intensity mixer in which heat is generated by mixing. The mixer was jacketed to provide heating and cooling and was connected to source of nitrogen to inert the atmosphere.

The thermosetting resin used was a polyester sold by Morton International, Inc. as 23-9030, having particles in the range of 30 microns. The aluminum used was a non-leafing aluminum.

The coating powder was charged into the mixer and nitrogen blanketed. In this case, the jacket was kept cool to avoid overheating the resin. The aluminum and resin were added to the mixer and blended for 10 minutes on high speed. The temperature achieved during the run was 106° F. (41° C.).

| Process Conditions | |
|---|---|
| Aluminum | 4% |
| Mixing time | 10 minutes |
| Temperature | 106° F. |
| Powder Properties | |
| HPGT @ 400°F. | 90 seconds |
| HPMF @ 375°F. | 150 mm |
| Coating Properties | |
| Gloss 60° | 75% |
| Brightness | Good |

This coating manufactured in the above way was used on a commercial coating for at least 8 hours of continuing reclaim without a substantial change in the color or metallic effect on the customer's line.

While the invention has been described in terms of certain preferred embodiments, modifications obvious to one with ordinary skill in the art may be made without departing from the scope of the invention.

Various features of the invention are set forth in the following claims.

What is claimed is:

1. A method for preparing a metal flake-containing coating powder comprising admixing a thermosetting resin-based coating powder and (b) metallic flake having flake ratios in the range of from about 10 to about 2000 to provide an admixture, and mixing in a rotating blade mixer with a tip speed of at least about 3 meters per second said admixture of said coating powder (a) and said flake (b) while heating said admixture to the softening point of the thermosetting resin in said coating powder (a) but below the melting temperature of the thermosetting resin in said coating powder (a), said mixing being conducted with sufficient shear to maintain a relative motion of coating powder particulates sufficient to prevent agglomeration of coating powder particulates, said mixing continuing for a time sufficient to adhere at least about 95% by weight of said flake (b) to said coating powder (a).

2. A method according to claim 1 wherein said flakes are leafing or non-leafing aluminum.

3. A method for preparing a metal-containing coating powder comprising admixing (a) a thermosetting resin-based coating powder and (b) metallic flake having flake ratios in the range of from about 10 to about 2000 to provide an admixture, and mixing in a rotating blade mixer with a tip speed of at least about 3 meters per second, said admixture of said coating powder (a) and said flake (b) while heating said admixture to between about 30° C. and about 70° C., said mixing being conducted with sufficient shear to maintain a relative motion of coating powder particulates sufficient to prevent agglomeration of coating powder particulates, said mixing continuing for a time sufficient to adhere at least about 95% by weight of said flake (b) to said coating powder (a).

4. A method according to claim 3 wherein said metal flakes are leafing or non-leafing aluminum.

* * * * *

UNITED STATES PATENT AND TRADEMARK OFFICE
CERTIFICATE OF CORRECTION

PATENT NO.  : 5,187,220

DATED       : 16 February 1993

INVENTOR(S) : Douglas S. Richart et al.

It is certified that error appears in the above-identified patent and that said Letters Patent is hereby corrected as shown below:

At column 1, line 50, "Sep. 3," should be -- 3 September --.

At column 7, line 27, "admixing a" should be admixing (a) a --.

Signed and Sealed this

Fifteenth Day of March, 1994

Attest:

BRUCE LEHMAN

Attesting Officer

Commissioner of Patents and Trademarks